Patented June 24, 1947

2,422,932

UNITED STATES PATENT OFFICE 2,422,932

IMPROVED SYNTHETIC RUBBERS

Herman E. Schroeder, Brandywine Hundred, and Charles J. Mighton, Christiana Hundred, Del., assignors to E. I. du Pont de Nemours & Company, Wilmington, Del., a corporation of Delaware No Drawing. Application September 6, 1944, Serial No. 552,934

2 Claims. (Cl. 260—86.5)

This invention relates to synthetic rubber-like materials and more particularly synthetic rubber-like materials having improved processing characteristics.

Although synthetic rubbers are superior to natural rubber in certain respects, they are relatively difficult to mill, and as a result the rubber industry is confronted with a marked decrease in the rated capacity of available processing equipment. Butadiene/styrene elastomers are particularly difficult to process due to their excessive nerve and lack of tack, and it is necessary, therefore, to compound smaller charges than is customary with natural rubber, thereby sacrificing time and overall cost efficiency. The usual rubber peptizing agents effect but minor improvements in the handling of butadiene/styrene elastomers and there is accordingly a definite need for more effective agents both to catalyze the break-down and increase the tack of these elastomers on the mill, thereby improving their general working characteristics.

This invention has as an object the provision of synthetic rubbers having improved milling properties. A further object is the production of butadiene-1,3 hydrocarbon elastomers having markedly superior milling characteristics. Additional objects will become apparent from an examination of the following description and claims.

These and other objects and advantages are accomplished according to the herein described invention which broadly comprises incorporating an acid of the group consisting of alpha, beta-unsaturated monocarboxylic acids and their anhydrides with an organic synthetic rubber, said synthetic rubber being an elastomer of the group consisting of polymeric butadiene-1,3 hydrocarbons and interpolymers of a butadiene-1,3 hydrocarbon with at least one other polymerizable compound which contains at least one ethylenic linkage.

By the term "alpha,beta-unsaturated monocarboxylic acid" as employed herein and in the appended claims is meant a carboxylic acid having only one carboxyl group and in which the carbon adjacent to the carboxyl carbonyl carbon is joined directly to another carbon by a multiple bond which is not present in a benzene nucleus.

By the term "polymerizable compound which contains at least one ethylenic linkage" as used herein and in the appended claims is meant an organic compound which contains at least one

double bond which is not present in a benzene nucleus, i. e., at least one ethylenic double bond, said compound having the property of polymerizing to yield high molecular weight compounds, i. e., products having a degree of polymerization greater than a trimer.

The following examples, in which proportions are in parts by weight unless otherwise specified, are given for illustrative purposes and are not intended to place any restrictions on the herein described invention.

Example I

Twenty parts of a butadiene/styrene synthetic rubber in which the weight ratio of butadiene to styrene is 75/25, prepared in the manner described in U. S. Patents 1,938,730 and 1,938,731 are worked on a rubber mill equipped with smooth six inch rolls heated to 70° C. with addition thereto of 1 part of sorbic acid. After 16 minutes of milling the synthetic rubber forms a smooth-running band uninterrupted by holes. The product at this stage shows good tack and can be compounded without difficulty.

In a similar experiment to the above in which no acid is added, the time necessary for formation of a smooth sheet is 86 minutes. Thus, the addition of the sorbic acid has reduced the milling time by 82%.

Example II

Using the procedure described in Example I, a sample of the butadiene/styrene synthetic rubber employed therein is treated with the acids listed in column 1 in the table below. The amount of acid used in each instance and the per cent reduction in milling time, as compared to a control in which no acid is added, is summarized in columns 2 and 3 of said table.

| Agent | Concentration, per cent | Decrease in milling time, per cent |
|---|---|---|
| None (control) | | 0 |
| Beta-(alpha-furyl) acrylic acid | 3 | 77 |
| Do | 5 | 79 |
| Alpha-cyanosorbic acid | 5 | 66 |
| Cinnamic acid | 5 | 66 |
| Crotonic acid | 3 | 78 |

Example III

Using the procedure described in Example I, 20 parts of butadiene/styrene synthetic rubber in which the weight ratio of butadiene to styrene is 60/40, prepared in the manner described in U. S. Patent 1,973,000, is worked with 0.8 parts of beta-furylacrylic acid until a smooth sheet which is free of holes is obtained. The time required is 10¼ minutes as compared to 16 minutes in the absence of the beta-furylacrylic acid. This represents a 36% reduction in milling time.

The present invention is applicable to organic synthetic rubbers, i. e., organic elastomers, which are obtained by the polymerization of butadiene- 1,3 hydrocarbons alone or admixed with at least one other polymerizable compound which contains at least one ethylenic linkage. Included among examples of said synthetic rubbers are polymers of butadiene-1,3 and its homologs, such as 2-methylbutadiene-1,3 and 2,3 - dimethylbutadiene-1,3 and interpolymers of said butadiene-1,3 hydrocarbons with at least one other polymerizable compound containing at least one ethylenic linkage, e. g., styrene, acrylonitrile, vinylidene chloride, esters of alpha-methylene carboxylic acids, such as methyl methacrylate and methyl acrylate, vinylethinyl carbinols such as dimethyl (vinylethinyl) carbinol. However, the invention is particularly useful as a means for improving the processing characteristics of butadiene-1,3/styrene synthetic rubbers.

In place of the specific acids disclosed in the examples, there can be used other alpha,beta-unsaturated monocarboxylic acids and their anhydrides. Included among examples of such compounds are alpha - methyl - beta-(2-furyl) acrylic acid, alpha-vinylcinnamic acid, acrylic acid, methacrylic acid, 2-octenoic acid, vinylacrylic acid, alpha-cyanosorbic acid, sorbic acid, alpha-cyano-beta-(2-furyl) acrylic acid, beta-(2-(5-methylfuryl)) acrylic acid, alpha-chloroacrylic acid, angelic and tiglic acids, propiolic acid and the like.

The concentration of the alpha,beta-unsaturated monocarboxylic acid or anhydrides thereof is generally within the range of from 0.1% to 5% of the weight of the synthetic rubber, although it is sometimes advantageous to use larger amounts, and the invention therefore is not limited to specific amounts of the acid or its anhydride. In most cases, however, we prefer to employ an amount of acid within the range of from 1% to 5% of the weight of the synthetic rubber being treated, since amounts within this range produce the desired effect and the use of higher concentrations is frequently not economical and may have adverse effects on the tensile properties of the ultimate vulcanizate. It is to be emphasized that the materials of this invention do not act as physical plasticizers but serve in a capacity as accelerators or catalysts for breakdown of the rubber. Hence, relatively small amounts are normally required to obtain the desired effect.

The alpha,beta - unsaturated monocarboxylic acids may be added in bulk or in the form of a suitable solution or dispersion by any of the techniques normally employed for compounding rubbers, i. e., on rubber mills or internal mixers, or they may be added to the emulsion polymerizates before coagulation or dispersion.

The plasticized products of this invention are useful in any of the well known commercial applications of synthetic rubber such as in tires, tubes, hose, gloves, and for coating and impregnating fabrics.

As many apparently widely different embodiments of this invention may be made without departing from the spirit and scope thereof, it is to be understood that we do not limit ourselves to the specific embodiments thereof except as defined in the appended claims.

Having described the present invention the following is claimed as new and useful:

1. The process for obtaining a synthetic rubber of improved milling characteristics, which comprises incorporating sorbic acid with a butadiene-1,3/styrene synthetic rubber wherein the weight ratio of butadiene to styrene is between about 60/40 to about 75/25, said acid being present in an amount within the range of from 1% to 5% of the weight of said synthetic rubber.

2. A synthetic rubber of improved milling characteristics which comprises a butadiene-1,3/styrene synthetic rubber wherein the weight ratio of butadiene to styrene is between about 60/40 to about 75/25, having admixed therewith an amount of sorbic acid within the range of from 1% to 5% of the weight of said synthetic rubber.

HERMAN E. SCHROEDER.
CHARLES J. MIGHTON.

REFERENCES CITED

The following references are of record in the file of this patent:

UNITED STATES PATENTS

| Number | Name | Date |
|---|---|---|
| 2,343,558 | Kirby | Mar. 7, 1944 |

FOREIGN PATENTS

| Number | Country | Date |
|---|---|---|
| 117,438 | Australia | Aug. 24, 1943 |
| 387,381 | Great Britain | Feb. 6, 1933 |